United States Patent

[11] 3,611,897

| [72] | Inventor | William T. Owens, Jr. |
| | | Long Lake, Minn. |
| [21] | Appl. No. | 809,239 |
| [22] | Filed | Mar. 21, 1969 |
| [45] | Patented | Oct. 12, 1971 |
| [73] | Assignee | Washington Scientific Industries, Inc. |
| | | Minnetonka, Minn. |

[54] PHOTOGRAPHIC INSTRUMENT
12 Claims, 7 Drawing Figs.

[52] U.S. Cl.................................................. 95/11 R, 95/12
[51] Int. Cl............................................. G03b 19/00
[50] Field of Search........................................ 95/11, 12

[56] References Cited
UNITED STATES PATENTS

| 1,625,952 | 4/1927 | Lucas............................ | 95/12 |
| 2,956,489 | 10/1960 | Carter........................... | 95/11 X |
| 3,205,767 | 9/1965 | Weber........................... | 95/12 UX |
| 3,308,716 | 3/1967 | Caporael....................... | 95/12 |
| 3,352,221 | 11/1967 | Barron.......................... | 95/11 |
| 3,366,033 | 1/1968 | Bishop........................... | 99/278 |

*Primary Examiner*—Samuel S. Matthews
*Assistant Examiner*—Monroe H. Hayes
*Attorney*—Burd, Braddock & Bartz ABSTRACT: A portable photographic instrument for photographing analytical objects suspended in a transparent media placed on or in a transparent carrier to provide a film record of the objects. The instrument has a housing enclosing a platform for supporting the carrier containing the objects. A photographic system including interchangeable film backs and a lens in the housing is located above and in axial alignment to the object. Two separate light sources are located below the platform for illuminating the object. The first light source has two lights located to either side laterally of an opening in the platform to provide side illumination and a dark field. The second light source located in general axial alignment with the opening, has a series of four lamps and illuminates a frosted glass plate from the bottom to provide a light background or field. A switch selectively activates the first light source or the second light source so that the object can be illuminated with either a dark background or a light background.

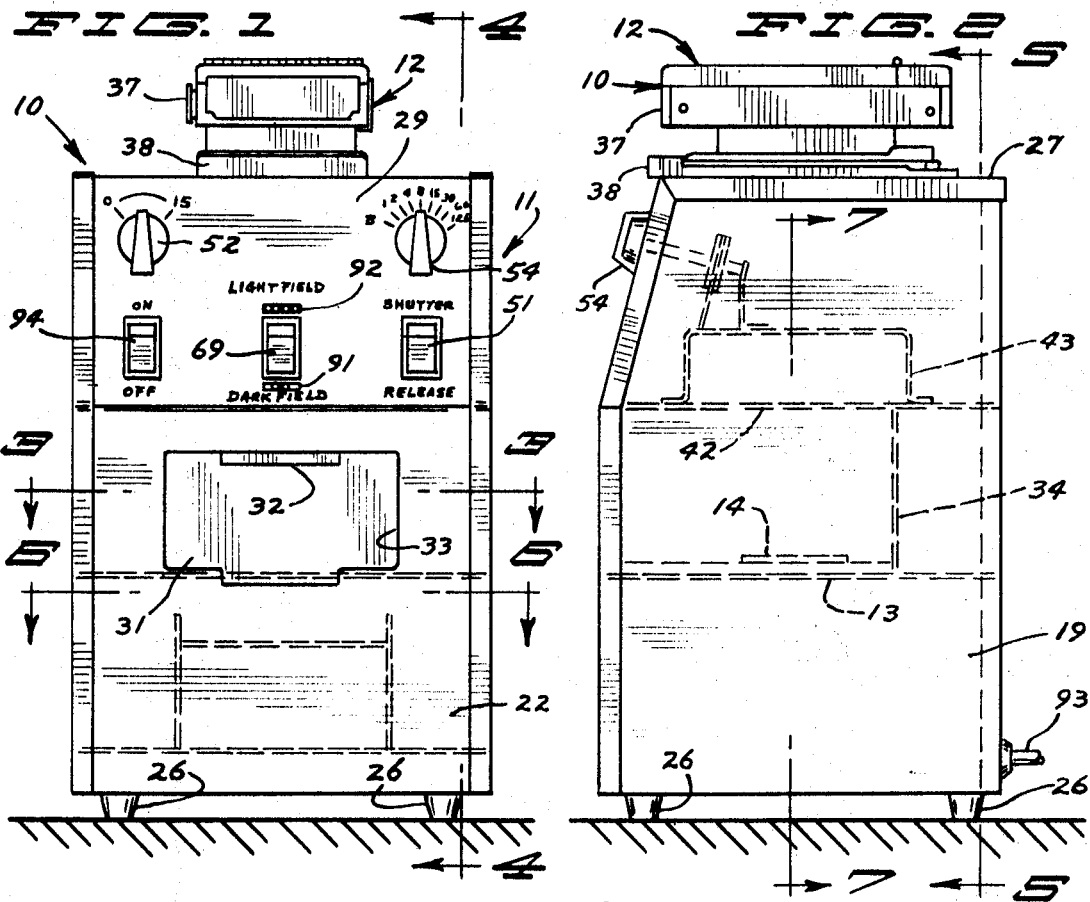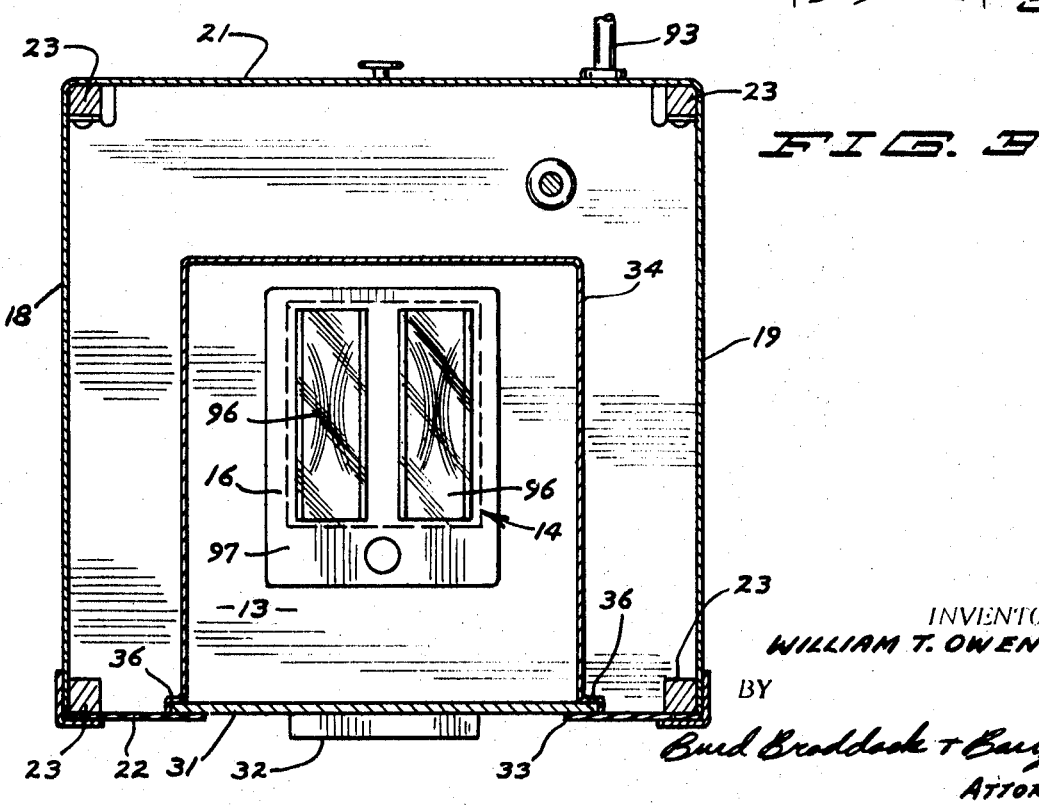

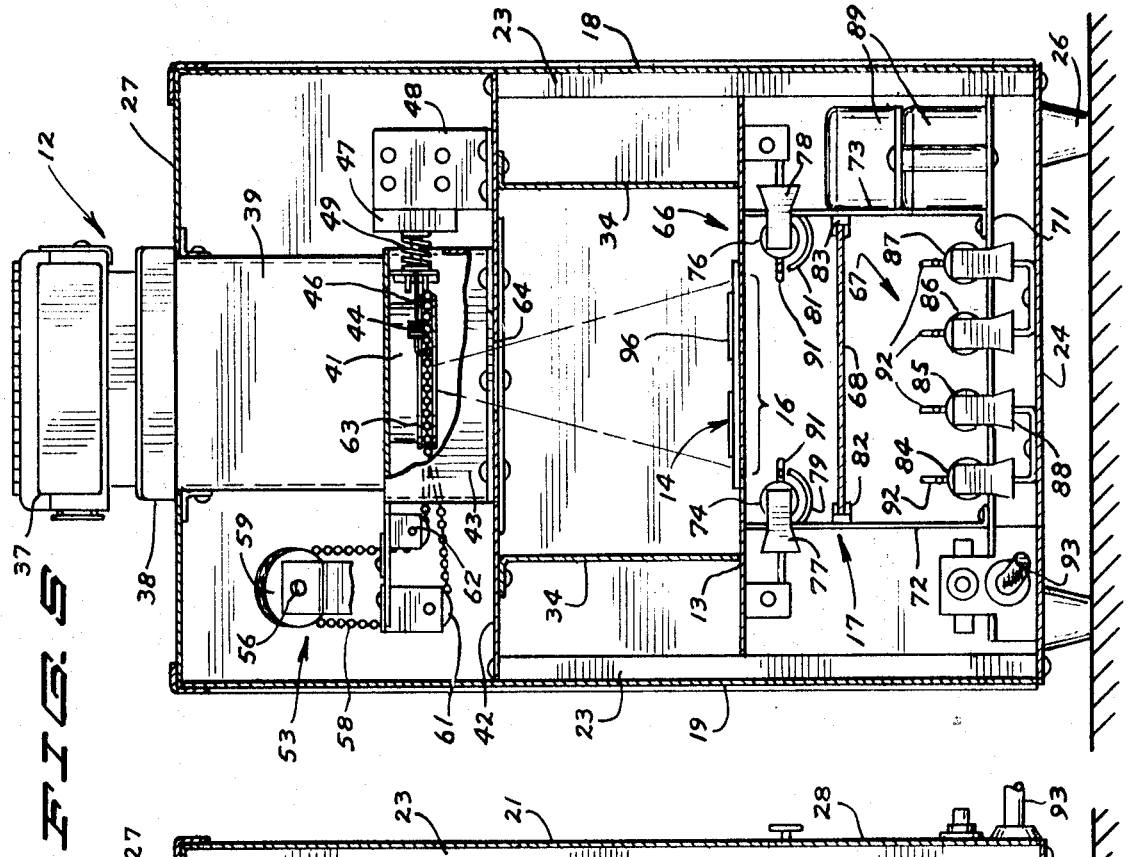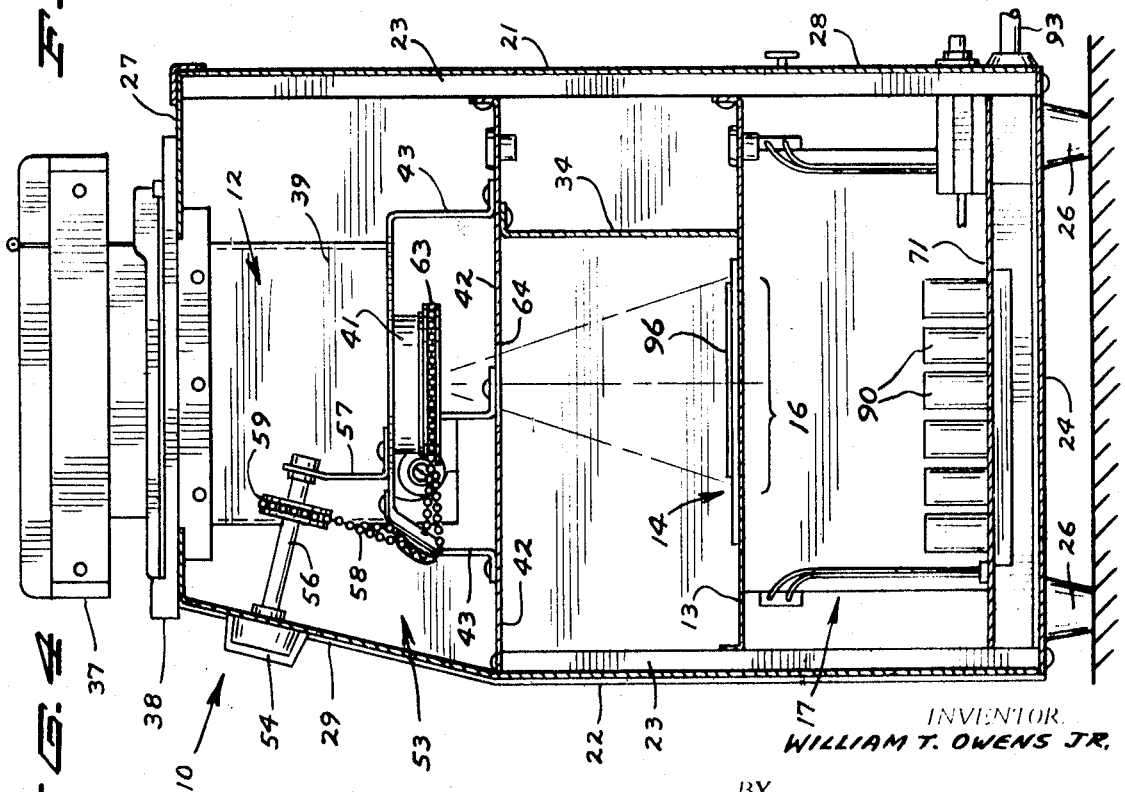

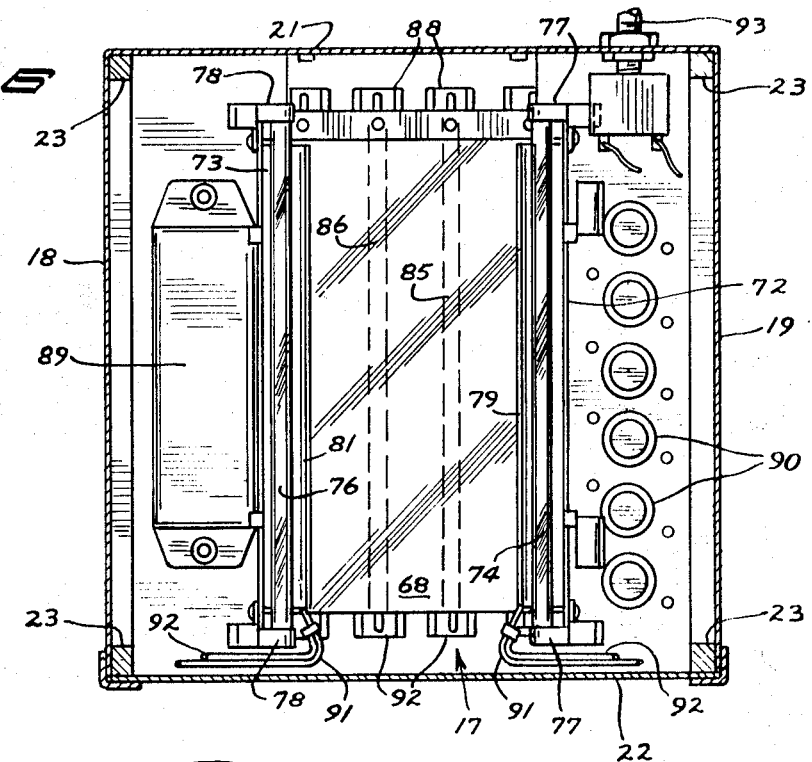
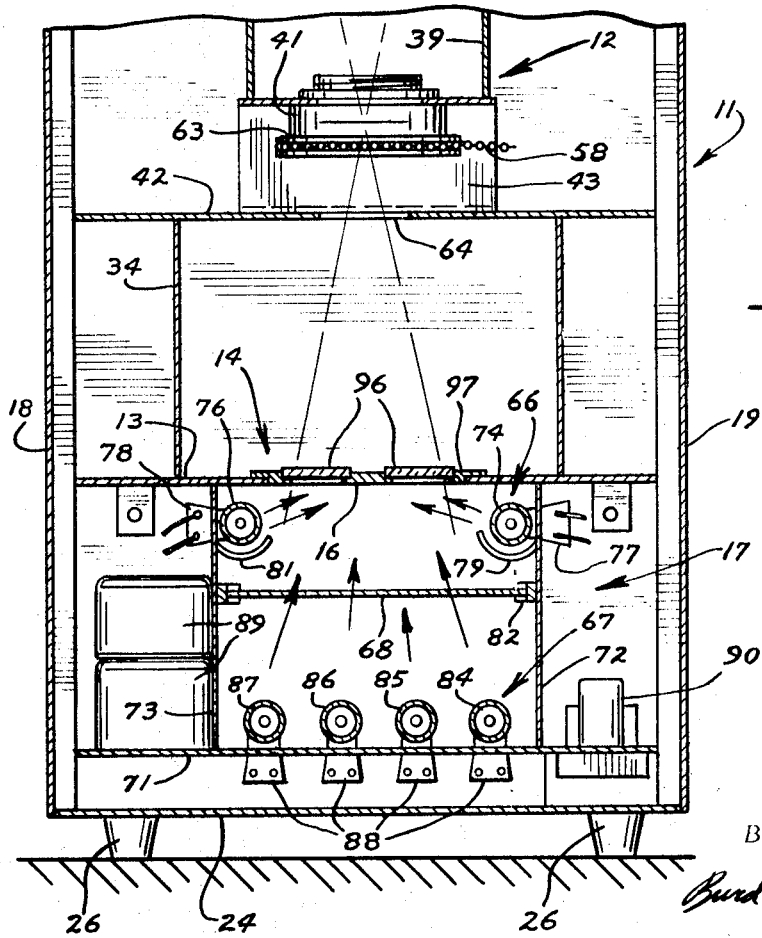

PHOTOGRAPHIC INSTRUMENT

BACKGROUND OF THE INVENTION

Laboratory photography is used in analytic and diagnostic techniques to record objects as a precipitate in a gel or test samples on a glass slide. Present photographic recording systems use a camera mounted over a stage with a light source beneath the stage to provide a background field. The light source is located a considerable distance away from the optical axis of the camera so that the background field is dark. In one form of a camera, shown in U.S. Pat. No. 3,366,003, a transparent stage is used to support the sample. An illuminating lamp is mounted over the stage and the lens and mirror system of the camera is located below to photograph the object from the bottom. The sample is illuminated by a circular source of light which surrounds a circular shield having a black center. To provide a white background, a separate removable stage is placed on the transparent stage between the object and the source of light. This requires a separate stage and manipulation to change from a dark background to a light background.

SUMMARY OF THE INVENTION

The invention relates to a camera instrument for taking the picture of an object, specimen or sample suspended in a transparent media placed on or in a transparent carrier including immuno-diffusion and electrophoresis photography. The instrument has a platform with an opening for supporting the object to be photographed. A light source means is located adjacent one side of the platform for illuminating the object. The light source means has a first light source located laterally of the opening to provide a dark field. A second light source located in general axial alignment with the opening provides a light field. A control means selectively activates the first light source and the second light source so that either the dark field or the light field can be used without changing the position of the object or adding equipment to the camera. Located on the opposite side of the platform is a photographic system optically aligned with the object illuminated with the light source. The photographic system has a removable film back that contains photographic film and a lens. Positioned between the film back and the platform is a lens having a shutter means actuated with a power means.

IN THE DRAWINGS

FIG. 1 is a front elevational view of the camera instrument;

FIG. 2 is a side elevational view of the camera instrument of FIG. 1;

FIG. 3 is an enlarged sectional view taken along the line 3—3 of FIG. 1;

FIG. 4 is an enlarged sectional view taken along the line 4—4 of FIG. 1;

FIG. 5 is an enlarged sectional view taken along the line 5—5 of FIG. 2;

FIG. 6 is an enlarged sectional view taken along the line 6—6 of FIG. 1; and

FIG. 7 is an enlarged sectional view taken along the line 7—7 of FIG. 2.

Referring to the drawing, there is shown in FIGS. 1 and 4 the camera instrument or photographic apparatus of the invention indicated generally at 10. The instrument 10 has a box-shaped housing supporting a photographic system indicated generally at 12 above a horizontal platform 13 carrying the samples, specimens or objects 14 to be photographed. The platform 13 has an opening 16 axially aligned with the photographic system 12. The object 14 is placed over the opening so that a light source indicated generally at 17 located below the platform 13 can illuminate the object to provide an image for the photographic system 12. As best shown in FIGS. 3, 4 and 5, the housing 11 has spaced upright sidewalls 18 and 19 joined to an upright back wall 21 and a front wall 22. The walls are secured to upright corner posts 23 extending upwardly from flat bottom 24. The top of the housing is closed with a top member 27 carrying the photographic system 12. A plurality of feet 26 secured to corner portions of the bottom 24 support the instrument on a surface.

The back wall 21 has a lower removable panel 28, shown in FIG. 4, providing access to the lower chamber of the housing carrying the light source unit 17. Panel 28 provides a quick access to the light source unit 17 and permits the removal of the light source unit for servicing and repair.

The front wall 21 has an upwardly and inwardly inclining control panel 29 carrying the camera control switches and light field and dark field monitors. As shown in FIGS. 1 and 3, located below the control panel 29 is a vertically movable door 31 having a horizontal bar handle 32. The door 31 is located behind a rectangular-shaped opening 33 in front wall 22 and is movable to an up close position and a down open position adjacent the inside of wall 22. The door 31 closes an object chamber formed by an upright wall 34 extended around a center portion of the platform 13. The wall 34 has outwardly a directed offset portions 36 adjacent the front wall 22 to form upright guide ways for the opposite sides of the door 31.

Referring to FIGS. 4 and 5, the photographic system comprises a film holder or film back 37 releasably connected to a mount 38 secured to the top wall 27. The film back 37 can be a Polaroid film (pack, roll, or sheet) having positive and negative photographic film or other conventional photographic films. The mount 38 has longitudinally spaced guide rails for receiving the film back. To remove the film back 37 from the mount 38 the pack is longitudinally moves relative to the guide rails. Secured to the lower side of the top wall 27 in alignment with the film holder 37 is a downwardly extended box 39. The box 39 has a bottom wall carrying a lens and shutter mechanism 41. As shown in FIG. 7, the lens and shutter mechanism is attached to the bottom wall of the box 39 to fix the distance to the platform 13. This fixed distance establishes a one-to-one ratio of the object to the film. Other distances and magnification ratios can be used in the camera. The lens and shutter mechanism 41 is located above a transverse wall 42 attached to the frame posts 23. An inverted U-shaped support 43 mounted on the top of wall 42 is secured to the bottom of the box 39.

The lens and shutter mechanism 41 has an outwardly projected shutter release lever 44 secured to a finger 46 connected to the movable member of a power motor shown as a solenoid 47. A bracket 48 secured to wall 42 supports the solenoid 47. A coil spring 49 surrounding the movable member of the solenoid functions to return the shutter release to its neutral position. The solenoid is electrically coupled to a shutter release switch 51 mounted on the control panel 29.

The lens and shutter mechanism 41 also has a shutter speed control indicated generally at 53 in FIGS. 4 and 5. The shutter speed control 53 comprises a manually operated knob 54 located adjacent the outside of the control panel 29 in operative relationship with indicia marks indicating shutter speed times. Knob 54 is rotatably mounted on a shaft 56 extended toward the box 39 and rotatably mounted on an upright bracket 57. The bracket 57 is secured to the top of the support 43. Rotational movement of the shaft 56 is transmitted through a bead chain 58 to the lens and shutter mechanism 41. The chain 58 is trained about a drive pulley 59 mounted on the shaft 56 and over directional pulleys 61 and 62 positioning the chain in alignment with a control ring 63 surrounding the outside of the lens and shutter mechanism 41. The chain 58 is in operative driving engagement with the control ring 63 so that on movement of the knob 54, the ring 63 will rotate and thereby change the speed of the shutter.

The lens and shutter mechanism 41 is in optical and vertical alignment with the object 14 to be photographed. The transverse plate 42 has an opening 64 immediately below the lens so that the image of the object 14 is in alignment with the film in the film holder 37.

As shown in FIG. 7, the light source unit 17 located below platform 13 has a first light source indicated generally at 66 located adjacent opposite sides of the opening 16. A second light source indicated generally at 67 located below the first light source and the opening 16 is separated from the first light source by horizontal light diffusion plate 68, as a frosted glass plate. The light sources 66 and 67 are connected to a control switch 69 mounted on the center portion of the control panel 29. The switch 69 is operative to selectively activate either the first light source 66 to provide a dark field or the second light source 67 to provide a light field or background under the objects 14.

The light source unit 17 has a flat horizontal baseplate 71 supporting spaced upright walls 72 and 73. As shown in FIGS. 5 and 7, the first light source 66 comprises a pair of elongated linear fluorescent tubes or lamps 74 and 76 located adjacent the insides of the walls 72 and 73 and laterally and below the opening 16 in platform 13. Opposite ends of the tubes 74 and 76 are retained in holders 77 and 78 mounted on the walls 72 and 73 respectively. Secured to the walls 72 and 73 and positioned below each tube 74 and 76 are elongated curved removable shields 79 and 81 which reflect the light from the tubes 74 and 76 in an upward direction toward the opening 16. The shields 79 and 81 prevent reflection of the light off of the light diffusion plate 68 at the sidewalls 72 and 73. The light from the tubes 74 and 76 is directed angularly through the opening 16 with the center portion of the opening remaining dark whereby a dark field or background is maintained. Linearly located below the shields 79 and 81 are elongated linear rails 82 and 83 having longitudinal grooves for receiving the opposite edges of the light diffusion plate 68.

The second light source 67 comprises a plurality of longitudinally spaced fluorescent tubes or lamps 84, 85, 86 and 87 positioned adjacent the baseplate 71 and connected at their opposite ends to the holders 88. Both the holders 77 and 78 for the first light source 66 and the holders 88 for the second light source 68 are connected to electrical ballasts 89 lamp starters 90 and the control switch 69 mounted on the front control panel 29.

As shown in FIG. 6, the operation of the fluorescent tubes 74 and 76 of the first light source 66 is monitored with a pair of optical fibers 91 which have one end located in close proximity to the tubes 74 and 76. The opposite ends of the fibers 91, as shown in FIG. 1, terminate at control panel 29 adjacent the bottom of the switch 69. The fluorescent tubes 84 to 87 are monitored in a similar manner with a plurality of optical fibers 92 which, as shown in FIG. 5, have one end located in close proximity to each of the tubes 84 to 87. The opposite end of the fibers 92 terminate at control panel 29 adjacent the top of the switch 69. The optical fibers provide a visual indication of the operation of each of the fluorescent tubes used to create the dark field and the separate light field.

The machine is electrically connected to the power source with an electric cord 23 which directs the power to a master on-off switch 94 mounted in the control panel 29. The switch 94 must be in the "on" position before the light sources and the camera shutter can be operated.

Referring to FIG. 3, there is shown the objects 14 to be photographed comprising microscope slides 96 positioned on a carrier, as a slide holder 97. The slide holder 97 is larger than the opening 16 in the platform 13 so that the slides are positioned over the opening exposing them to both the first light source 66 and the second light source 67. The holder 97 may be replaced with other carriers, as a petri dish holder, an immuno-diffusion plate holder, a hemagglutination plate holder or other transparent holders for objects to be photographed.

In use, the object to be photographed is initially placed on the carrier. The carrier is then placed on the holder and inserted into the photographing chamber on the platform 13 over the opening 16. The door 31 is open to provide access into the photographic chamber. On moving the door 31 upwardly to the close position, the photographic chamber is shielded from outside light by the upright walls 34 and the top transverse wall 42.

The film back 37 on the mount 38 has a supply of film retained in optical alignment with the lens and shutter mechanism 41. The object 14 can be photographed with either a light background or a dark background without adding structure or changing the position of the illuminating light source. The control switch 69 is moved to a down position to activate the first light source 66 comprising the fluorescent tubes 74 and 76 located adjacent opposite sides of the opening 16. As shown in FIG. 7, the light from the tubes 74 and 76 is directed upwardly and inwardly and at a relatively flat angle with respect to the object through the hole or opening 16 object. The shields 79 and 81 prevent the light from reflecting off of the light diffusion plate 68 so that the background for the object 14 is dark. The control knob 54 is turned to set the exposure time for the shutter mechanism 41 to provide variation for the light contrast in the photograph. The shutter is released by the shutter release switch 51.

When using Polaroid film pack in the film back 37 the combined negative and positive film is pulled from the film back after exposure. A timer 52 is actuated for 15 seconds to time the development of the film. When the timer activates a bell the negative is peeled from the positive to provide the photograph of the object.

The specimen can also be photographed with a light background by changing the switch 69 to the light field position. This will activate the fluorescent tubes 84 to 86 and turn off the tubes 74 and 76. The light emanating from the tubes 84 to 86 diffuses through the plate 68 to provide uniform light distribution over the entire area of the opening 16. The photograph of the object is obtained in the same manner as described above.

All the lamps can be replaced with lamps of varying spectro output to provide different types of light which can be coordinated with various films. Other changes size and structure may be made without departing from the spirit of the invention.

The embodiments of the invention in which an exclusive property or privilege is claimed are defined as follows:

1. An apparatus for the photography of objects associated with transparent means comprising: a platform for supporting an object to be photographed, said platform having an opening axially aligned with a portion of said object, a camera supported in optical alignment with said object and said opening, light source means located adjacent the side of the platform opposite said camera for illuminating said object, said light source means having a first light source located off the axis of said opening for providing a dark background and a second light source located in general axial alignment with said opening for providing a light background, and means to selectively activate said first light source or said second light source to selectively provide a dark background or a light background.

2. The apparatus of claim 1 including: light diffusing means located between the first light source and the second light source.

3. The apparatus of claim 2 wherein: the light diffusing means is a flat frosted glass plate.

4. The apparatus of claim 1 wherein: the first light source is a pair of fluorescent lamps located on opposite sides of the opening and below the platform.

5. The apparatus of claim 4 including: light shield means located below each fluorescent lamp to direct light in an upward direction.

6. The apparatus of claim 4 wherein: the second light source is a plurality of fluorescent lamps located below the first light source.

7. The apparatus of claim 6 including: light diffusion means located between the first light source and the second light source.

8. The apparatus of claim 1 wherein: the camera includes a film holder for carrying photographic film and a lens for focusing an image of the object on the film.

9. The apparatus of claim 8 including: mount means for releasably holding the film holder.

10. The apparatus of claim 8 including: shutter means associated with the lens and motor means connected to the shutter means whereby activation of the motor means operates the shutter means.

11. The apparatus of claim 1 wherein: the apparatus includes an enclosed housing, said platform separating the housing into an upper chamber and a lower chamber, said light source means being removably located in said lower chamber.

12. The apparatus of claim 11 including: a box secured to the housing, said camera including a lens attached to the box and a removable film back on the housing.

PO-1050
(5/69)

UNITED STATES PATENT OFFICE
CERTIFICATE OF CORRECTION

Patent No. 3,611,897            Dated October 12, 1971

Inventor(s) William T. Owens, Jr.

It is certified that error appears in the above-identified patent and that said Letters Patent are hereby corrected as shown below:

Column 1, line 64, after "housing", --11-- is omitted.

Column 2, line 28, "moves" should be --moved--.

Signed and sealed this 27th day of June 1972.

(SEAL)
Attest:

EDWARD M. FLETCHER, JR.
Attesting Officer

ROBERT GOTTSCHALK
Commissioner of Patents